(12) United States Patent
Piacenti et al.

(10) Patent No.: US 7,198,444 B2
(45) Date of Patent: Apr. 3, 2007

(54) MULTI-GRIP BLIND RIVET

(75) Inventors: Frank Piacenti, Campbellsville, KY (US); Jerry W. Robertson, Columbia, KY (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/266,418

(22) Filed: Oct. 8, 2002

(65) Prior Publication Data

US 2003/0219324 A1 Nov. 27, 2003

Related U.S. Application Data

(63) Continuation-in-part of application No. 10/153,761, filed on May 22, 2002, now abandoned.

(51) Int. Cl.
*F16B 19/10* (2006.01)

(52) U.S. Cl. .......................... 411/38; 411/41

(58) Field of Classification Search ............ 411/34–38, 411/43, 501, 283, 284, 71, 74, 9, 10; 29/524.1, 29/515.06, 243.531, 245.53
See application file for complete search history.

(56) References Cited

U.S. PATENT DOCUMENTS

| | | | | |
|---|---|---|---|---|
| 2,030,166 A | * | 2/1936 | Huck | 72/370.01 |
| 2,324,142 A | * | 7/1943 | Eklund | 411/38 |
| 2,542,967 A | * | 2/1951 | Waechter | 248/188.5 |
| 2,754,871 A | * | 7/1956 | Stoll | 411/283 |
| 3,136,203 A | * | 6/1964 | Davis | 411/38 |
| 3,202,036 A | * | 8/1965 | Simko | 411/39 |
| 4,289,060 A | * | 9/1981 | Emmett | 411/34 |
| 4,615,655 A | | 10/1986 | Dixon | |
| 4,778,318 A | * | 10/1988 | Jeal | 411/43 |
| 4,958,971 A | | 9/1990 | Lacey et al. | |
| 5,044,850 A | | 9/1991 | Getten et al. | |
| 5,248,231 A | | 9/1993 | Denham et al. | |
| 5,496,140 A | | 3/1996 | Gossmann et al. | |
| 5,645,383 A | | 7/1997 | Williams | |
| 6,004,086 A | | 12/1999 | Gand et al. | |
| 6,254,324 B1 | | 7/2001 | Smith | |
| 6,538,894 B1 | * | 3/2003 | Treiber et al. | 361/724 |

FOREIGN PATENT DOCUMENTS

| | | | | |
|---|---|---|---|---|
| DE | 26 25 023 | * | 12/1976 | 411/34 |
| EP | 0677666 | | 10/1995 | |
| EP | 1114936 A2 | | 7/2001 | |

* cited by examiner

*Primary Examiner*—Flemming Saether
(74) *Attorney, Agent, or Firm*—Ajay K. Gambhir; Edward D. Murphy (57) ABSTRACT

A multi-grip blind rivet 74 includes a rivet body 82, adapted to receive a portion of a mandrel 76. A plurality of indentations 88 are formed in an outer surface 86 of the rivet body 82 in each of three axially spaced transaxial planes. Each indentation 88 is formed with a work hardened base surface 90 having a convex portion, which is formed with axially spaced first and second transaxial edges 106 and 108 having nonlinear portions. Adjacent indentations 88 are separated by ribs 89. A flared intermediate surface 122 extends between the base surface 90 and the outer surface 86. The rivet 74 is assembled within aligned holes 128 and 130 of workpieces 124 and 126, respectively, where, upon setting of the rivet, the indentations 88 collapse and the outer surface 86 bulges against walls of the holes to retain the workpieces together.

2 Claims, 4 Drawing Sheets

MULTI-GRIP BLIND RIVET

This application is a continuation-in-part of applicant's application U.S. application Ser. No. 10/153,761, filed May 22, 2002, and titled MULTI-GRIP BLIND RIVET, now abandoned. The disclosure of applicant's above-noted application is incorporated herein by reference thereto.

BACKGROUND OF THE INVENTION

This invention relates to a multi-grip blind rivet, and particularly relates to a multi-grip blind rivet having one or more radial indentations formed in one or more transaxial planes of a rivet body of the rivet.

Typically, multi-grip blind rivets include a mandrel, or stem, formed with a head at one axial end thereof, and a rivet body, formed as a sleeve or shank having a passage therethrough and a flange at one axial end thereof. A mandrel-body assembly is formed by inserting a non-head end of the mandrel into the passage at a non-flange end of the rivet body and through the passage. With this assembly, the head of the mandrel is eventually resting against the non-flange end of the rivet body and the non-head end of the mandrel is extending outward from the flange end of the body. The assembly is then processed through a forming operation where a groove is, or plural indentations are, formed in the outer periphery of the rivet body in a given transaxial plane. A plurality of grooves could be formed in the outer periphery of the rivet body, in spaced transaxial planes, along the axial length of the body in lieu of the indentations.

In known multi-grip rivets of the type described above, the grooves are continuous, and concave with respect to outer surface of the shank, with a concave work hardened surface formed at the base of the groove. With respect to the known multi-grip rivets which are formed with indentations, each such indentation, and the base thereof, could be concave with a concave work hardened base. Or, the indentations could be formed with flared upper and lower walls extending from a flat work hardened surface, which is in the form of a secant to the circumference of the shank of the rivet body.

Subsequent to the formation of the grooves in the rivet body, the mandrel-body assembly is placed within aligned openings of two or more workpieces to be secured together by the rivet. The diameter of the aligned openings is greater than the diameter of the external surface of the shank of the rivet body. In this position, an outer surface of one of the workpieces is in interfacing engagement with an underside surface of the flange of the rivet body. Thereafter, while supporting the flange of the rivet by the nosepiece of the setting tool, the setting of the rivet begins by applying a pulling load, in an axial direction away from the flange, on the portion of the mandrel which extends outward from the shank of the rivet body. The pulling load on the mandrel is transferred to the rivet body shank under a compressive load.

Continued application of the pulling load results initially in the outward radial bulging of the rivet body located axially between the spaced planar grooves followed by near axial closing of each of the grooves and a corresponding axial shortening of the rivet body. As the outwardly bulging section of the rivet body contacts the outer surface of the workpiece, and with the shortening of the axial length of the rivet body, the workpiece parts are clamped together.

Eventually, the multi-grip blind rivet has been set whereby the bulging sections of the rivet body are in firm, distorting engagement with the inner walls of the aligned holes of the workpieces, which creates a gripping action between the bulging sections and the inner walls to retain the workpieces together.

The setting performance of the above-described multi-grip blind rivet, commonly configured either with grooves or swaged indentations along the rivet body, does not perform well where the materials of the workpieces are soft and/or friable, especially where the holes are oversize and there are extremes of grip thickness.

A common form of multi-grip blind rivet, as illustrated and described in U.S. Pat. Nos. 4,958,971 and 6,004,086, has circumferential grooves, usually hemispherical in shape, spaced at intervals along the axial length of the shank of the rivet body. The grooves are concave with respect to the outer surface of the shank of the rivet body. As this type of blind rivet is being set, the plain cylindrical rivet body portions between the grooves expand radially to form a characteristic "cottage loaf" setting and the grooves collapse in an axial direction giving the capability for wider workpiece thicknesses.

As further illustrated and described in U.S. Pat. No. 6,254,324, one or more reinforcing ribs may be formed within the circumferential concave groove, or between circumferential-groove-like indentations, and extend radially from the base of the groove to the outer periphery of the shank of the rivet body.

The control of the depth of the grooves is critical to accommodate the extreme conditions mentioned. For example, if the groove is too deep, cracking of the base of the groove will occur upon setting of the rivet. If the groove is too shallow, there will not be sufficient resistance to prevent the mandrel head from pulling into, or even through, the rivet body.

With respect to the above-noted U.S. patents, a work hardened area may be formed at the base, or bottom, of the groove and will contribute to the development of a resistance to the pulling of the mandrel head into the rivet body. Also, the load being exerted by the mandrel head is transposed to the rivet body and to the groove profile. This load increases under the action of the setting tool causing the rivet body to expand radially between the grooves as the body shortens. The setting process reaches a point where groove closes or collapse, thereby indicating the completion of the setting of the rivet.

Small differences in the groove depth of the grooves, as illustrated and described in the above-noted U.S. patents, can give significant differences in the collapse load. This condition, together with normal manufacturing variations in mandrel crimp breakload, could lead to either premature rivet body failure or the pulling of the mandrel head into the rivet body.

In another type of multi-grip rivet, as illustrated and described in U.S. Pat. No. 5,496,140, indentations are formed at predetermined distances along the shank of the rivet body, with flared upper and lower walls extending outward from a flat work hardened base, which is in the form of a secant to the circumference of the shank. During the setting operation of this type of rivet, the indented portions retain their integrity and allow the intermediate portions between the indentations to collapse.

With respect to the rivet illustrated and described in U.S. Pat. No. 5,496,140, after the mandrel-body assembly has been formed as described above, the rivet body is indented with a series of flat-bottom indentations, such as four equispaced identical indentations in a common transaxial plane around the rivet body. The formation of the indentations provide four thickened portions with work hardened zones therebetween. This structure avoids fully circumferential work hardening and the subsequent risk of rivet body cracking during the application of the mandrel setting load.

As the rivet-setting load is being applied in the setting of the rivet of U.S. Pat. No. 5,495,140, the rivet section, which includes the four thickened portions and the indentations, is supporting the setting load. Again, there is a point in the setting profile where the setting load overcomes the resistance of the work hardened zones and the indentations collapse to complete the setting of the rivet. With this type of rivet, body rupturing is avoided, but only small variations in indentation depth and mandrel crimp break load could result in an incomplete setting or the mandrel head being pulled through the rivet body.

When setting rivets of the types described above, there are two basic concerns which must be addressed:

a. During setting in softer workpiece materials, the grooves or indentations are required to be deeper than normal to prevent the mandrel head from pulling through the rivet body. However, this structure can cause fracture of the rivet body, due partly to the thinness of the material of the body and partly to the degree of material work hardening. If the grooves or indentations are not at an optimum depth, the mandrel can be pulled into the rivet body; and b. If the grooves or indentations are less than optimum during the setting operation, the mandrel head can be pulled through the rivet body due to insufficient resistance being provided by the rivet body, and little or no resistance being provided by the soft workpiece materials. In extreme cases, the result is that the portion of the mandrel shaft extending from the mandrel head can protrude beyond the flange, thereby creating a potentially hazardous condition. Such a condition could cause excessive radial expansion of the rivet body resulting in splitting of the workpiece material as the radial expansion takes place within the hole of the workpiece.

SUMMARY OF THE INVENTION

Therefore, it is an object of this invention to provide a multi-grip blind rivet which will provide excellent performance when used with a variety of workpiece materials, and including workpieces having wide variations of plate thickness and oversize holes and/or slots.

Another object of this invention is to provide a multi-grip blind rivet that provides a relatively wider band of resistance to the setting load.

A further object of this invention is to provide a multi-grip blind rivet which is relatively inexpensive to manufacture.

With these and other objects in mind, this invention contemplates a multi-grip blind rivet which includes a mandrel and a hollow cylindrical body having an outer surface and formed about an axis thereof and adapted to receive at least a portion of the mandrel therethrough. A plurality of indentations are formed in the outer surface of the cylindrical body, with at least one indentation of the plurality of indentations formed with a base surface having a convex portion.

In addition, this invention contemplates a multi-grip blind rivet which includes a mandrel and a hollow cylindrical body having an outer surface and formed about an axis thereof and adapted to receive at least a portion of the mandrel therethrough. A plurality of indentations are formed in the outer surface of the cylindrical body, with each indentation formed with a base surface having a first transaxial edge, and a second transaxial edge spaced axially from the first transaxial edge. The first transaxial edge is nonlinear such that axial distances between a plurality of pairs of axially spaced points of the first and second transaxial edges varies between the opposite ends of the first transaxial edge.

Further, this invention contemplates a multi-grip blind rivet which includes a mandrel and a hollow cylindrical body having an outer surface and formed about an axis thereof and adapted to receive at least a portion of the mandrel therethrough. A plurality of indentations are formed in the outer surface of the hollow cylindrical body, with at least one indentation of the plurality of indentations formed with a base surface having an endless outboard edge around the base surface. The at least one indentation is formed with an intermediate surface which extends between, and is contiguous with, the outer surface of the hollow cylindrical body and the entirety of the endless outboard edge of the base surface.

Additionally, this invention contemplates a plurality of ribs formed in the transaxial plane with each rib separating an adjacent pair of the plurality of indentations.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
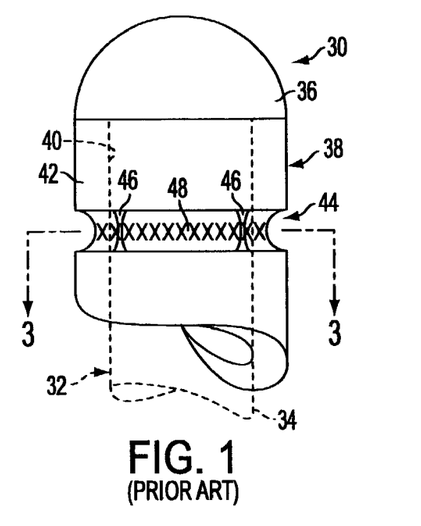
FIG. 1 is a side view showing a portion of a first prior art multi-grip blind rivet.
Figure 2:
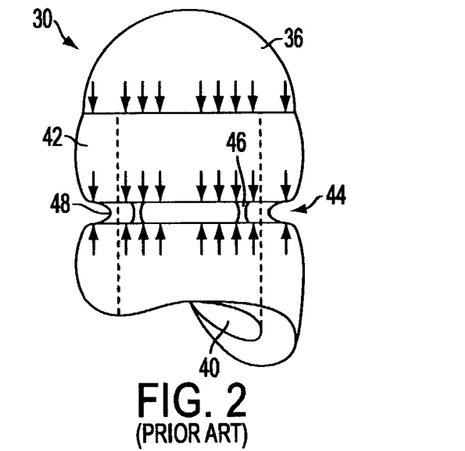
FIG. 2 is a side view of the rivet of FIG. 1 with arrows showing the directions of setting loads resulting from a pulling or setting load applied to a mandrel of the first prior art rivet.
Figure 3:
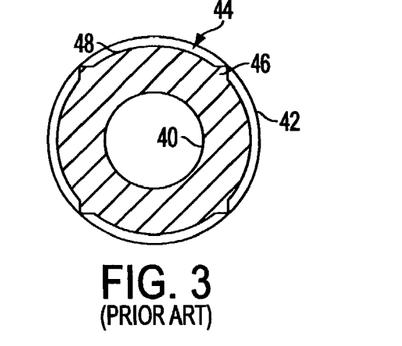
FIG. 3 is a sectional view taken along line 3—3 of FIG. 1 showing certain structural features of the first prior art rivet.

Referring to FIGS. 1, 2 and 3, a prior art multi-grip blind rivet 30 includes a mandrel 32 formed with a stem 34 and a pulling head 36, and a rivet body 38 having an axial passage 40. An outer surface 42 of the rivet body 38 is formed, in a transaxial plane, with a plurality of indentations 44, each of which is concave, as viewed from the exterior of the rivet body, and generally hemispherical in shape. A plurality of ribs 46 are formed in the outer surface 42 of the rivet body 38, formed as a result of the indentations 44, with each rib separating adjacent indentations. An inward-most portion 48 of each indentation 44 is work hardened as represented by cross hatching in FIG. 1. A multi-grip blind rivet of this type is illustrated and described in U.S. Pat. No. 6,254,324.

Figure 4:
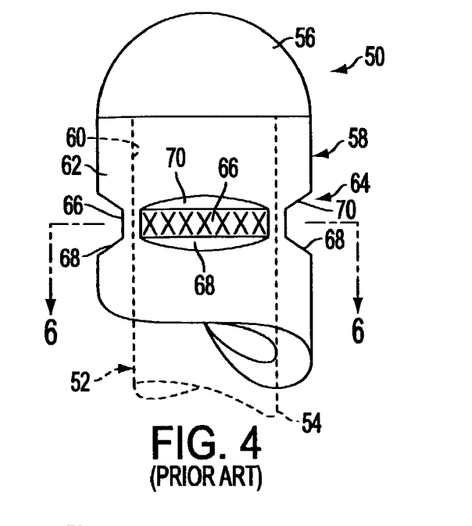
FIG. 4 is a side view showing a portion of a second prior art multi-grip blind rivet.
Figure 5:
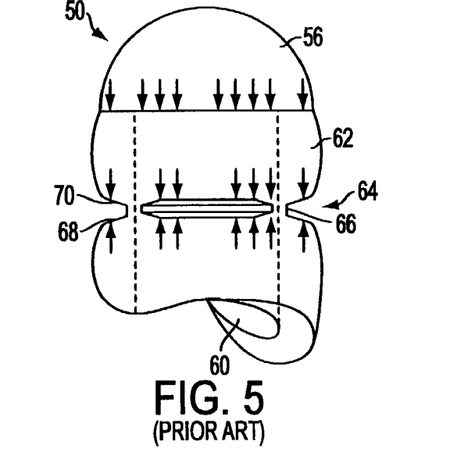
FIG. 5 is a side view of the rivet of FIG. 4 with arrows showing the directions of setting loads resulting from a pull load applied to a mandrel of the second prior art rivet.
Figure 6:
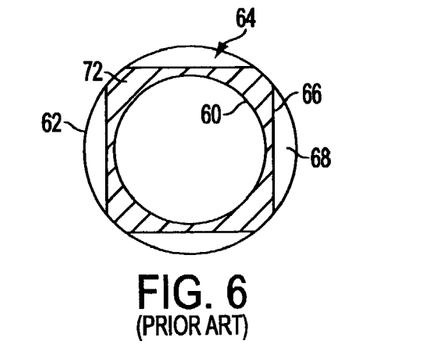
FIG. 6 is a sectional view taken along line 6—6 of FIG. 1 showing certain structural features of the second prior art rivet.

Referring to FIGS. 4, 5 and 6, another prior art multi-grip blind rivet 50 includes a mandrel 52 formed with a stem 54 and a pulling head 56, and a rivet body 58 having an axial passage 60. An outer surface 62 of the rivet body 58 is formed, in a transaxial plane, with a plurality of indentations 64, each of which is formed with a flat inner surface 66, as viewed from the exterior of the rivet body, and a pair of flared transition surfaces 68 and 70 spatially located on axially opposite sides of the surface 66. Referring to FIG. 4, each of the flat inner surfaces 66 are work hardened as represented by the cross hatching and, referring to FIG. 6, form a secant to the circular configuration of the outer surface 62 of the rivet body 58. The indentations 64 are structured such that a large portion 72 of the rivet body remains between, and separates, adjacent indentations. A multi-grip blind rivet of this type is illustrated and described in U.S. Pat. No. 5,496,140.

In use of each of the rivets 30 and 50, workpieces (not shown) are assembled, in a conventional manner, where the unset rivet components rest on a flange (not shown), which is formed on an end of the rivet body. Thereafter, a free end portion of the mandrel stem, which extends from the flange end of the rivet body, is grasped and pulled away from the rivet body. As a result of the stem-pulling action, a rivet-setting load is applied through the mandrel head to the adjacent end of the rivet body, as shown by an upper row of arrows in FIGS. 2 and 5. Also, load forces are exerted on axially opposite sides of the indentations, as shown in FIGS. 2 and 5, whereby the indentations begin to, and eventually, collapse and close. Also, the outer surface of the rivet body bulges outward, or expands radially, to provide for securance engagement between the rivet and the workpieces, thereby retaining the workpieces together.

As noted above, multi-grip blind rivets of the type illustrated in FIGS. 1 through 6 perform well when securing workpieces composed of relatively hard materials. However, problems could be encountered when the workpieces are composed of materials that are soft and/or friable, particularly when the holes of the workpieces are oversized and there are extremes of grip thickness. Also, with the softer and/or friable workpieces, there could be concern for the undesirable pulling of the mandrel head through the rivet body during the application of the setting load. Further, as noted above, possible problems could be related to the depth of the indentations, such as when the depth of the indentation is too deep, or too shallow.

Figure 7:
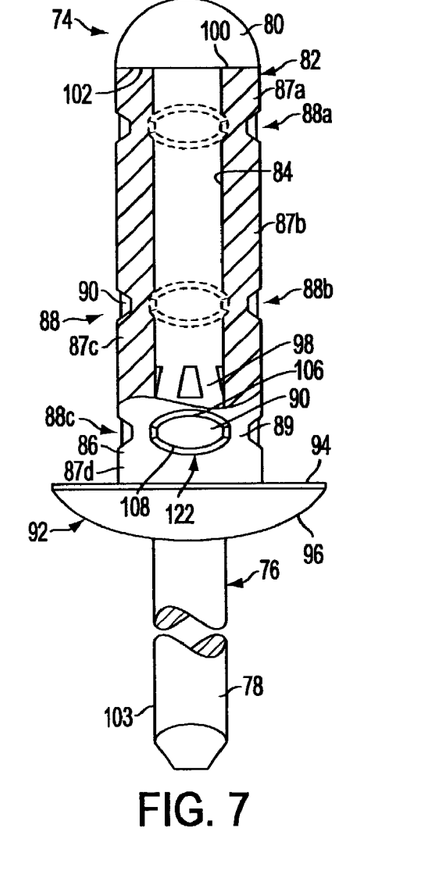
FIG. 7 is a partial-sectional side view showing a multi-grip blind rivet, including a mandrel in assembly with a rivet body having indentations formed in an outer surface thereof, in accordance with certain principles of the invention.
Figure 15:
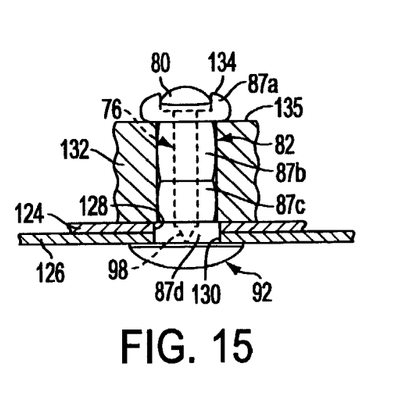
FIG. 15 is a side view showing a set rivet in assembly with the two workpieces of FIG. 11, and a third workpiece of greater thickness, to retain the three workpieces together, in accordance with certain principles of the invention.

Referring now to FIGS. 7 and 15, in the preferred embodiment of the invention, a multi-grip blind rivet 74 includes a mandrel 76 formed with a stem 78 and a pulling head 80 at one end of the stem. The pulling head 80 is formed with an underside surface 102.

The rivet 74 further includes a rivet body, or a hollow cylindrical body, having an axial passage 84 formed about an axis 85 (FIG. 8) of the rivet body. The rivet body 82 is formed with an outer surface 86 at a prescribed radius about the axis 85. The rivet body 82 is also formed with a flange 92, at a flange end thereof, which has a flat surface 94 facing a sleeve-like portion of the rivet body and has a dome-like surface 96 facing away from the sleeve-like portion. A breakneck 98 is formed in the stem 78 of the mandrel 76, near the flange 92, and is considerably spaced from the mandrel head 80. A flangeless end 100 is formed at an end of the rivet body 82, opposite the flange end thereof.

During assembly of the components of the rivet 74, the stem 78 of the mandrel 76 is inserted into the passage 84 at the flangeless end 100 of the rivet body 82 until the underside surface 102 of the mandrel head 80 engages the flangeless end. The axial length of the mandrel stem 78 is such that a free end portion 103 of the stem extends outward from the passage 84 at the flange end of the rivet body 82.

Thereafter, the outer surface 86 of the rivet body 82 is formed with a first plurality of indentations 88a, a second plurality of indentations 88b, and a third plurality of indentations 88c, which are located in three axially spaced first, second and third transaxial planes, respectively, as illustrated in FIG. 7. It is noted that, in the preferred embodiment, the plurality of indentations 88b in the second transaxial plane, which is the middle plane of the three planes, is closer to the plurality of indentations 88c in the third transaxial plane than to the plurality of indentations 88a in the first transaxial plane.

Figure 11:
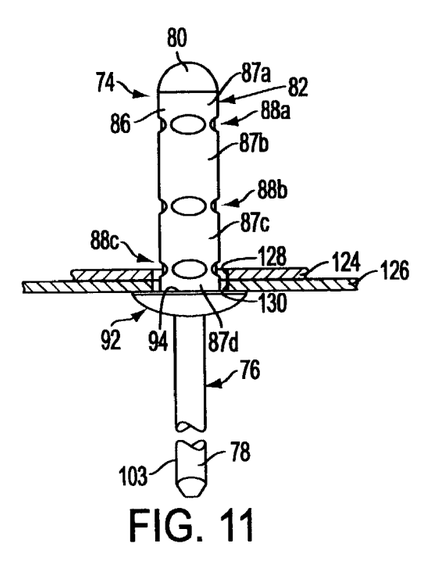
FIG. 11 is a side view showing the multi-grip blind rivet of FIG. 7 in assembly with two workpieces, of generally equal thickness, which are to be retained together by the eventual setting of the rivet in accordance with certain principles of the invention.

The three transaxial planes define four segments 87a, 87b, 87c and 87d of the rivet body 82 between opposite ends of the rivet body, as shown in FIGS. 7 and 11, which are also shown as deformed segments in FIGS. 12, 13, 14 and 16. Of the four segments, the segments 87a and 87d are of the shortest axial length, which could be of equal, or unequal, lengths, without departing from the spirit and scope of the invention. The segment 87b is of the longest axial length, and the segment 87c is of an intermediate axial length, as compared to the shortest and the longest axial lengths.

In the preferred embodiment, the rivet 74 is formed with the four segments 87a, 87b, 87c and 87d. The rivet could be formed with two segments, three segments, or more than four segments, without departing from the spirit and scope of the invention.

Hereinafter, the numeral "88" will be used to refer to the indentations generally, and the numerals "88a," "88b" and "88c" will be used to refer to the specific indentations in the first, second and third transaxial planes, respectively.

In the preferred embodiment, there are four indentations 88 in each of the first, second and third transaxial planes. As few as two indentations 88, and as many as practical, for example, at least eight indentations 88, could be formed in any one or more of the first, second and third transaxial planes without departing from the spirit and scope of the invention.

In addition, a plurality of indentations could be formed in the outer surface 86 of the rivet body 82 in a single transaxial plane, instead of in three transaxial planes of the preferred embodiment, with at least one indentation of the plurality of indentations in the single plane conforming to the structure of the indentation 88, without departing from the spirit and scope of the invention.

The rivet body 82 is formed with a plurality of ribs 89 in the first, second and third transaxial planes, with each rib separating adjacent indentations 88 in a respective one of the three planes. Each indentation 88 is formed with an inwardmost base surface 90, which is work hardened as represented by cross hatching in FIG. 8.

Figure 8:
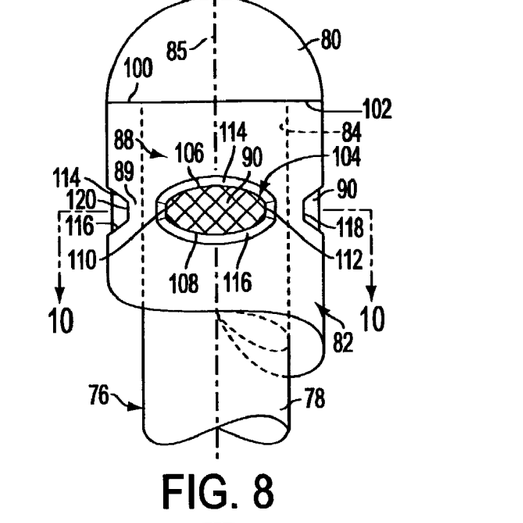
FIG. 8 is a partial side view showing the indentations formed in the rivet body of FIG. 7 in accordance with certain principles of the invention.

Referring to FIG. 8, the base surface 90 of each indentation 88 is formed with an endless outboard edge 104 around the base surface. The endless outboard edge 104 includes a first transaxial edge 106 and a second transaxial edge 108, which is spaced axially from the first transaxial edge. The endless outboard edge 104 further includes a first side edge 110 and a second side edge 112, which are axially aligned and circumferentially spaced from each other. The first side edge 110 and the second side edge 112 are integrally joined with respective opposite ends of the first and second transaxial edges 106 and 108 to thereby form the endless outboard edge 104 of the base surface 90.

It is noted that the shape of the indentation 88, as viewed from the exterior of the rivet 74, is generally similar to the shape of a human "eye."

The first transaxial edge 106 of the base surface 90 is nonlinear between opposite ends thereof, such that axial distances between a plurality of pairs of axially spaced points of the first and second transaxial edges 106 and 108, respectively, varies between opposite ends of the first transaxial edge. For example, assume that the first transaxial edge 106 is shaped as an arc, as shown in FIG. 8, which extends in an axial direction away from the second transaxial edge 108, and that, for purposes of this example, the second transaxial edge 108 is linear between opposite ends thereof. Then select a first pair of spaced points on the first and second transaxial edges 106 and 108, respectively, with the pair of points being axially aligned, and adjacent the second side edge 112. In this instance, the distance between the first pair of points is slightly greater than the length of the second side edge 112, due to the slight rise of the arc of the nonlinear first transaxial edge 106 at that point.

Then select a second pair of axially aligned points on the first and second transaxial edges 106 and 108, respectively, at a location equally circumferentially spaced, for example, from the first and second side edges 110 and 112, respectively. At this location, the arc of the nonlinear first transaxial edge 106 is at its farthest axial distance from the second transaxial edge 108, which represents the distance between the second pair of points. Comparatively, the distance between the second pair of points is greater than the distance between the first pair of points. This example represents the manner in which the respective axial distances between a plurality of axially spaced points on the first and second transaxial edges 106 and 108, respectively, varies between opposite ends of the first transaxial edge.

It is noted that, in the preferred embodiment, both the first and second transaxial edges 106 and 108, respectively, are each nonlinear between opposite ends thereof. However, either, but not both, the first transaxial edge 106 or the second transaxial edge 108 could be linear, as in the example above, and the other edge be nonlinear without departing from the spirit and scope of the invention. Further, either the first transaxial edge 106 or the second transaxial edge 108, or both, could be formed with a nonlinear portion, rather than the entirety of the edges being nonlinear, without departing from the spirit and scope of the invention.

In addition, the second transaxial edge 108 can be formed in the shape of an arc, as illustrated in FIG. 8, extending in an axial direction away from the first transaxial edge 106. In the preferred embodiment, the arcs of the first and second transaxial edges 106 and 108, respectively, of each base surface 90 are of the same shape and are in an orientation in which the first and second transaxial edges are concave toward each other.

Figure 10:
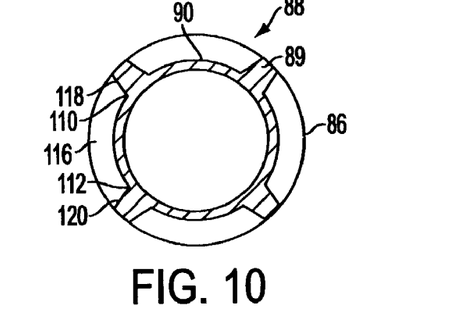
FIG. 10 is a sectional view taken along line 10—10 of FIG. 8 showing structural features of portions of the indentations of the rivet body of FIG. 7 in accordance with certain principles of the invention.

Referring to FIG. 8, the inward extent of the base surface 90 is shown as vertical lines within two indentations 88 on radially opposite sides of the rivet 74. Referring to FIG. 10, the base surface 90 of each indentation 88 extends outward and is formed with a convex portion between the first and second side edges 110 and 112, respectively, as viewed from the exterior of the rivet body 82. Further, as shown in FIG. 10, the base surface 90 of each indentation 88 forms an arc surface facing in a direction away from the axis 85 (FIG. 8) of the rivet body 82, and is formed at a radius about the axis of the rivet body which is less than the prescribed radius of the outer surface 86 of the rivet body.

Consequently, the arc surfaces, formed by the base surfaces 90 in any one of the first, second or third transaxial planes, are each located on spaced portions of an imaginary circle which is concentric with, and within, a circle which is coincidental with the circumference of the outer surface 86 of the rivet body 82.

Referring again to FIG. 8, each of the indentations 88 is formed with a first border surface 114, which is contiguous with the first transaxial edge 106 of the base surface 90, and which flares away from the base surface, toward the flangeless end 100 of the rivet body 82 and toward the outer surface 86 of the body. Each of the indentations 88 is also formed with a second border surface 116, which is contiguous with the second transaxial edge 108 of the base surface 90, and which flares away from the base surface toward the flange 92 (FIG. 7) of the rivet body 82 and toward the outer surface 86 of the body.

The preferred embodiment of the rivet 74 is formed with the flared first border surface 114 and the flared second border surface 116, which are contiguous with first transaxial edge 106 and the second transaxial edge 108, respectively, to provide a transition between the base surface 90 and the outer surface 86 of the rivet body 82. The transition surfaces, between the base surface and the outer surface 86, need not be flared, but could be, for example, surfaces which are at right angles to the base surface 90 without departing from the spirit and scope of the invention.

Referring to FIGS. 8 and 10, each of the indentations 88 is further formed with a third border surface 118, which is contiguous with the first side edge 110 of the base surface 90, and which flares away from the base surface in a circumferential direction and toward the outer surface 86 of the rivet body 82. Each of the indentations 88 is further formed with a fourth border surface 120, which is contiguous with the second side edge 112 of the base surface 90, and which flares away from the base surface in a circumferential direction and toward the outer surface 86 of the rivet body 82.

The first, second, third and fourth border surfaces 114, 116, 118 and 120, respectively, are in the form of a plurality of differently oriented surfaces which are integrally and continuously joined about the endless outboard edge 104 of the base surface 90 to form an intermediate surface 122. The intermediate surface 122 is flared outward in different directions away from the endless outboard edge 104 of the base surface 90, and extends between, and is contiguous with, the outer surface 86 of the rivet body 82 and the endless outboard edge.

Figure 9:
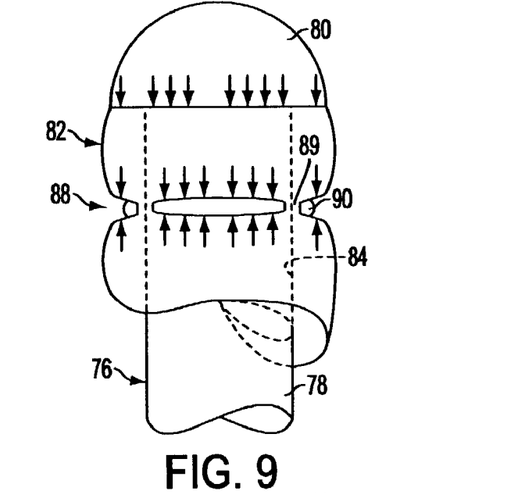
FIG. 9 is a side view of the rivet of FIG. 7 with arrows showing the directions of setting loads resulting from a pull load applied to the mandrel in accordance with certain principles of the invention.

Referring to FIG. 11, a first workpiece 124 and a second workpiece 126 are to be retained together by a set rivet. the workpieces 124 and 126 are generally of equal thickness, and are formed with respective oversize holes 128 and 130. The diameter of the holes 128 and 130 is larger than the diameter of the outer surface 86 of the rivet body 82, and are thereby oversize in comparison with the rivet body. Initially, the workpieces 124 and 126 are assembled with the rivet 74 as shown in FIG. 11. The free end 103 of the mandrel stem 78 is grasped and pulled away from the flange 92 so that pull or setting loads are developed in the direction of the arrows shown in FIG. 9.

Figure 12:
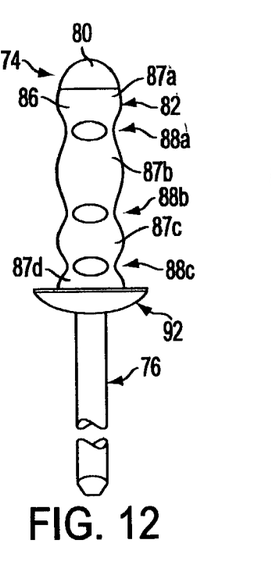
FIG. 12 is a side view showing early-stage radial bulging of the rivet body of FIG. 11 and an early phase of the collapsing or closing of the indentations of FIG. 7 in accordance with certain principles of the invention, with the workpieces of FIG. 11 not shown for the purpose of clarity.
Figure 13:
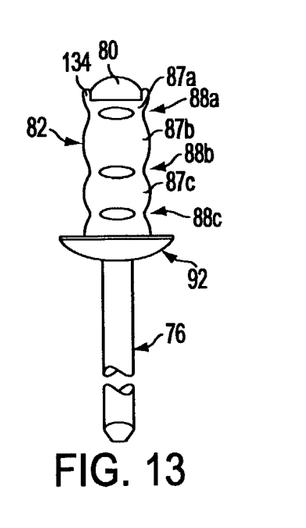
FIG. 13 is a side view showing later-stage radial bulging of the rivet body of FIG. 11 and a later phase of the continuation of the collapsing of the indentations of FIG. 7 formed in the body in accordance with certain principles of the invention, with the workpieces not shown for the purpose of clarity.

The workpieces 124 and 126 are not shown in FIGS. 12 and 13 in order that the bulging of the segments 87a, 87b, 87c and 87d may be visualized. As shown in FIG. 12, with the application of the setting load, the indentations 88 begin to collapse, and the segments 87a, 87b, 87c and 87d of the rivet body 82 begin to bulge radially outward. In this mode, the segment 87d is bulging toward engagement with the walls of the holes 124 and 126 (FIG. 11), and the segments 87a, 87b and 87c are also bulging.

Referring to FIG. 13, upon continued pulling of the free end 103 of the mandrel stem 78, the indentations 88 are nearly closed, and the segments 87a, 87b, 87c and 87d continue to bulge radially outward. Also, the mandrel head 80 is being pulled into the segment 87a at the flangeless end 100 (FIG. 7) of the rivet body 82.

Figure 14:
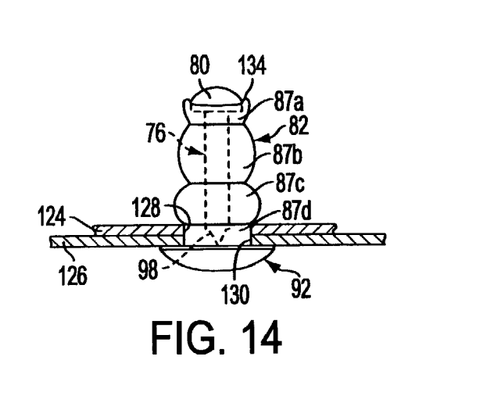
FIG. 14 is a side view showing a set rivet after final-stage radial bulging of the rivet body of FIG. 11 and completion of the collapsing of the indentations of FIG. 7 formed in the body in accordance with certain principles of the invention, with the workpieces of FIG. 11 being shown.

Eventually, as shown in FIG. 14, the rivet 74 is set whereby the indentations 88 are completely collapsed and closed, and the segments 87a, 87b, 87c and 87d of the rivet body 82 have reached their maximum bulge. The segment 87d has expanded radially outward to fully engage the walls of the openings 128 and 130 of the workpieces 124 and 126, respectively, to facilitate retaining the workpieces together. Also, the segment 87c has expanded radially outward to overlap a portion of the outer surface of the workpiece 124, adjacent the opening 128 thereof, to capture the workpieces 124 and 126 between the flange 92 and the segment 87c. In this manner, the workpieces 124 and 126 are retained together.

Additionally, the mandrel head 80 has been pulled farther into the segment 87a of the rivet body 82, with the segment having portions 134 which wrap partially and slightly about a portion of the head to assist in retaining the mandrel 76 with the rivet body 82 after the rivet has been set. Also, at this time, the portion of the mandrel stem 78, which includes the free end 103, separates at the breakneck 98 (FIG. 7) from the remaining portion of the breakneck, and is removed.

As shown in FIG. 15, another example of an assembly of workpieces includes a third workpiece 132, which has been assembled with the first and second workpieces 124 and 126, as in the process step illustrated in FIG. 11. The third workpiece 132 is of a thickness which is greater than the thickness of either of the first and second workpieces. When the rivet 74 is set, the expanded segment 87d facilitates the retaining together of the first and second workpieces 124 and 126, as described above. The radially outward expansion of the segments 87b and 87c, which are located within an axial hole 133 of the third workpiece, facilitate the retention of the third workpiece with the first and second workpieces.

In addition, the mandrel head 80 has been pulled downward to the extent that the segment 87a expands radially outward, and overlaps a portion of an outward surface 135 of the third workpiece 132, which is adjacent the hole 133, to capture the first, second and third workpieces 124, 126 and 132 between the flange 92 and the expanded segment 87a, to further facilitate the retaining together of the three workpieces. Also, the portion 134 of the segment 87a partially surrounds the head 80 to retain the mandrel 76 with the rivet body 82 after the rivet 74 has been set.

Figure 16:
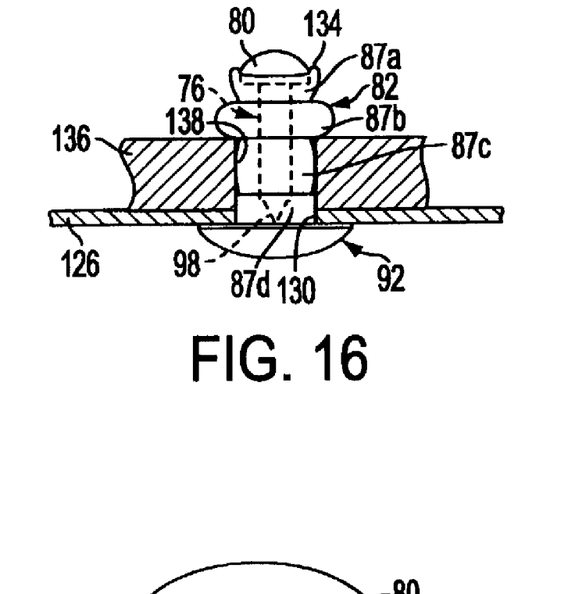
FIG. 16 is a side view showing a set rivet in assembly with a first workpiece of a prescribed thickness, and a second workpiece of a thickness greater than the prescribed thickness, to retain the two workpieces together, in accordance with certain principles of the invention.
Figure 17:
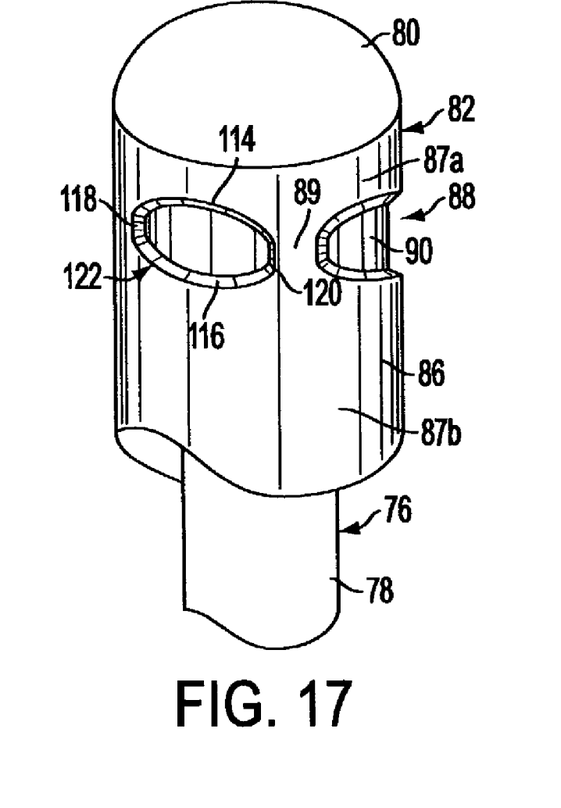
FIG. 17 is a perspective view showing a portion of the rivet body of FIG. 7, with the indentations formed therein in accordance with certain principles of the invention.

As shown in FIG. 16, the workpiece 126, of a small thickness, and a workpiece 136 of greater thickness, have been assembled with the unset rivet 74, in accordance with the process step illustrated in FIG. 11. When the rivet 74 is set, the expanded segments 87c and 87d facilitate the retaining together of the workpiece 126 and the workpiece 136. It is noted that a portion of the segment 87d expands into engagement with the hole 130 of the workpiece 126, and the remaining portion of the segment 87d expands into engagement with a portion of a hole 138 of the workpiece 136. The segment 87c expands into engagement with the remaining portion of the hole 138. In addition, the mandrel head 80 has been pulled downward to the extent that the segment 87b expands radially outward, and overlaps a portion of an outward surface of the workpiece 136, which is adjacent the hole 138, to capture the workpieces 126 and 136 between the flange 92 and the segment 87b, to further facilitate the retaining together of the workpieces. Also, the portion 134 of the segment 87a partially surrounds the head 80 to retain the mandrel 76 with the rivet body 82 after the rivet 74 has been set.

The multi-grip blind rivet 74 provides excellent performance in a wide variation of workpiece thickness, oversize holes and/or slots in a variety of workpiece materials. This excellent performance is achieved by building the above-noted features into the rivet body 82 that give a wider band of resistance to the setting load and, therefore, control the radial expansion, or bulging, of the rivet body 82. This will limit the extent to which the mandrel head 80 enters the rivet body 82.

As noted above, after assembly of the mandrel 76 with the rivet body 82, the plurality of indentations 88 are formed into the rivet body at the selected transaxial planes along the rivet body. It is the shape of the indentations 88 that give the multi-grip blind rivet 74 its ability for delivering an improved control of collapse of the indentations, as established by the nonlinearity of the first and second transaxial edges 106 and 108, respectively, to provide variable distances or widths therebetween. In addition, the convex form of the base surface 90 of the indentations 88 provides an enhanced capability of the multi-grip blind rivet 74 for further control of the collapse of the indentations.

The depth of the variable distances, or width, between the first and second tranaxial edges 106 and 108, respectively, of the indentations 88 can be more accurately controlled due to its relatively greater area of contact of the tooling. This will lead to a better and more predictable product performance. Additionally, since the mandrel breakneck 98 is remote from the mandrel head 80, a relatively greater stability during the setting of the rivet 74, and an improved resistance to shear after setting, can be obtained.

The segments 87*a*, 87*b*, 87*c* and 87*d* of the rivet body 82 bulge, or expand, sequentially as the rivet body shortens under the action of the setting tool. The work hardened base surface 90 in the indentations 88 control the rate of collapse within the profile of the indentations.

The base surface 90 of the indentations 88, as well as the variable distance, or width, follow the diametric shape of the rivet body 82, but are interrupted to form the four ribs 89. The material of the indentations 88 has a greater hardness compared with the material which forms the ribs 89 between the indentations. The ribs 89 add resistance to the collapse of the indentations 88.

The shape of the indentations 88 is not linear, as described above, and varies in axial distance, or width, to provide an "eye" shaped profile as shown in FIG. 8. The arrangement of this shape provides greater setting stability over a band of setting loads due to the variable distance, or width, of the indentation 88. Thus, the variable geometry of the "eye" shape of the indentations 88 provides accrued benefits in the form of a much better control and stable collapse of the indentations, and an indentation collapse that is progressive over a broad spread of setting load.

The attainment of better control of the setting of the rivet 74 is due to the broad, work hardened area which will accommodate a greater variation in the depth of the indentation 88 and in the break load of the mandrel breakneck 89. At the same time, since the variable distance, or width, portions may be progressively different in their maximum width, this will insure that the rivet body 82 will bulge progressively from the end of the rivet.

In general, the above-identified embodiments are not to be construed as limiting the breadth of the present invention. Modifications, and other alternative constructions, will be apparent which are within the spirit and scope of the invention as defined in the appended claims.

What is claimed is:

1. A multi-grip blind rivet; which comprises:

a mandrel;

a hollow cylindrical body having an outer surface and formed about an axis thereof and adapted to receive at least a portion of the mandrel therethrough;

a first plurality of indentations formed in the outer surface of the hollow cylindrical body in a first transaxial plane;

a second plurality of indentations formed in the outer surface of the hollow cylindrical body in a second transaxial plane spaced axially from the first transaxial plane;

each of the first plurality and second plurality of indentations formed with a base surface having a first arcuate transaxial edge and a second arcuate transaxial edge spaced axially from the first transaxial edge;

the first arcuate transaxial edge and the second arcuate transaxial edge being located radially inboard of the outer surface of the hollow cylindrical body; and the first arcuate transaxial edge and the second arcuate transaxial edge concavely facing each other and having noncoincident centers of curvature.

2. A multi-grip blind rivet, which comprises:

a mandrel;

a hollow cylindrical body having an outer surface and formed about an axis thereof and adapted to receive at least a portion of the mandrel therethrough, a plurality of indentations formed in the outer surface of the cylindrical body;

at least one indentation of the plurality of indentations formed with a base surface having a first arcuate transaxial edge extending along a length thereof and a second arcuate transaxial edge spaced axially from the first arcuate transaxial edge, with the first arcuate transaxial edge and the second arcuate transaxial edge being radially inboard of the outer surface of the hollow cylindrical body; and the first arcuate transaxial edge and the second arcuate transaxial edge concavely facing each other and having noncoincident centers of curvature.

* * * * *